United States Patent [19]

Mastropieri

[11] 4,221,277
[45] Sep. 9, 1980

[54] DEVICE FOR AUTOMATICALLY RETURNING A TRANSMISSION CONTROL TO NEUTRAL

[76] Inventor: Antonio Mastropieri, 11241 W. Grand Ave., Northlake, Ill. 60164

[21] Appl. No.: 946,333

[22] Filed: Sep. 27, 1978

[51] Int. Cl.$^2$ ............................................. B60K 23/00
[52] U.S. Cl. ..................................... 180/273; 60/445; 74/470
[58] Field of Search .................. 180/82 A, 82 B, 101, 180/77 D, 77 R, 273; 188/24, 110; 60/445, 465; 74/470, 502, 567, 569

[56] References Cited

U.S. PATENT DOCUMENTS

| | | | |
|---|---|---|---|
| 2,273,907 | 2/1942 | Stahl | 74/470 |
| 2,911,053 | 11/1959 | Ayers et al. | 180/101 |
| 3,265,150 | 8/1966 | Westman | 74/502 |
| 3,700,062 | 10/1972 | Garnett | 180/101 |
| 4,011,768 | 3/1977 | Tessenske | 180/82 A |

OTHER PUBLICATIONS

"Machine Design", 1971 Reference Issue, Jun. 17, 1971, p. 152.

Primary Examiner—David M. Mitchell
Attorney, Agent, or Firm—Dulin, Thienpont & Potthast, Ltd.

[57] ABSTRACT

A device for automatically returning a transmission control to neutral including a seat operated linkage connected to a camming member which in turn is connected to a transmission control member whereby in one position of the camming member the transmission control member is free to be placed in either a forward or reverse position and in a second position of the camming member the transmission control member is confined to a neutral position.

7 Claims, 3 Drawing Figures

4,221,277

DEVICE FOR AUTOMATICALLY RETURNING A TRANSMISSION CONTROL TO NEUTRAL

BACKGROUND OF THE INVENTION

This invention relates to a seat operated device for automatically placing the transmission of a vehicle in neutral when the seat is unoccupied.

Mechanisms of this general type have heretofore been proposed and are described for example, in U.S. Pat. Nos. 3,265,150 Automatic Return To Neutral Mechanism for Vehicle Transmission issued Aug. 9, 1966 and 3,700,062 Neutral Device for Internal Combustion Engine Powered Trucks issued Oct. 24, 1972. Devices of this type as well as the one disclosed in this application are safety devices which are designed to prevent undesired movement of the vehicle, such as a tractor or lift truck, for example, when a driver is not occupying the seat. In the device of the invention herein, for example, if a driver should be thrown from or fall from the seat, the seat will move to a linkage non-actuating position and permit the manually operable transmission control lever to move to a neutral position, and with the control lever in such a neutral position the vehicle transmission cannot be put into gear.

SUMMARY OF THE INVENTION

A primary object of the present invention is to provide a seat-operated device for use in a vehicle which will automatically return a transmission control to neutral when the seat is unoccupied.

Another object of this invention is to provide in furtherance of the primary object a camming device as part of the linkage interconnecting the seat mechanism and the transmission control to control the position of the transmission control.

Another object of the invention is to provide in furtherance of the primary object a seat and linkage operated plate cam connected to a manually operable transmission shift control element to effect a positive return-to-neutral condition in an associated transmission.

Other objects and advantages of the invention will become more apparent when considering the following description and accompanying drawings.

DESCRIPTION OF A PREFERRED EMBODIMENT

Figure 1:
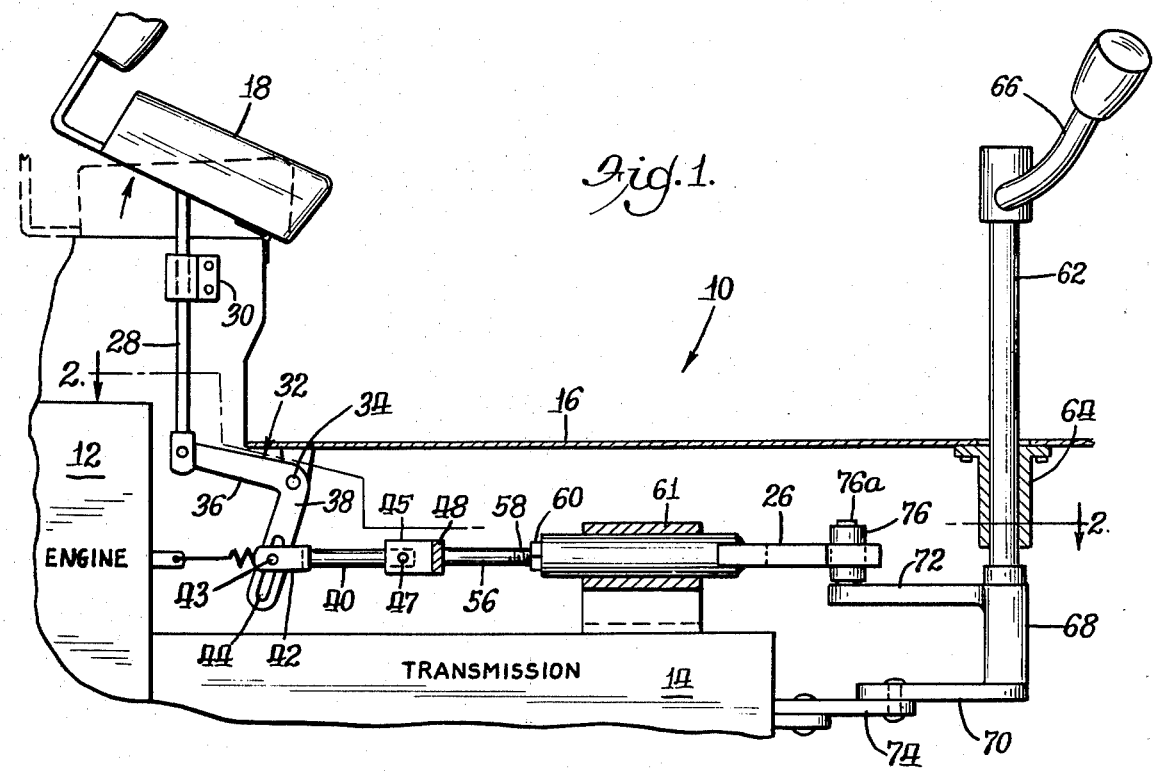
FIG. 1 is an elevation view of a portion of a lift truck showing a seat operated linkage mechanism embodying the invention herein for controlling the position of a transmission control element.

We turn now to the drawings in which like reference numerals in the various drawings designate the same parts. In FIG. 1 there is shown a portion of a lift truck 10 incorporating the invention and including an engine 12, transmission 14, and a chassis or frame portion 16. A seat 18 is mounted on the chassis to pivot forwardly about pivot point 20.

A linkage mechanism 22 and a manually operable transmission control element 24 are also mounted on the lift truck chassis or frame 16. A control cam plate 26 is interposed between and connected to the linkage mechanism 22 and the transmission control element 24.

The linkage mechanism 22 includes a rod member 28 slidably mounted to the chassis 16 by a bracket member 30 and disposed under the seat 18 for vertical actuation thereby. A bell crank 32 is pivotally connected to the chassis or frame 16 at 34. The bell crank 32 has one arm 36 pivotally connected to the lower end of rod member 28 and another arm 38 extending approximately at a right angle to arm 36. The linkage mechanism 22 also includes a longitudinally movable rod 40 with a bifurcated end portion 42 having pin 43 extending therethrough to interconnect with longitudinal slot 44 formed in the end of arm 38 of the bell crank 32. The other end of the rod 40 is formed with a bifurcated portion 45 which is connected to projecting portion or lug 46 by a pin 47 extending through the bifurcated portion 45 and the lug 46 welded to transversely extending bracket 48. A pair of tension return springs 50a and 50b are connected at one end to the chassis or frame 16 at 52a and 52b and at the other end to bracket 48 by adjustable nut and bolt arrangements 54a and 54b. The latter nut and bolt arrangements permit the spring tension in springs 50a and 50b to be adjusted as desired. A rod member 56 is welded at its one end to the back side of bracket 48 and at its other end is formed with a threaded portion 58 which is threaded into one end of rod member 60. Rod member 60 is slidably disposed in support bracket member 61 for longitudinal movement therein. The other end of rod member 60 is rigidly connected to control cam plate 26. The bracket member 61 may be secured to the transmission housing by bolts or other suitable means.

The manually operable transmission shift control element 24 comprises a vertically extending shaft 62 rotatably mounted in a guide bushing 64 connected to the chassis or frame 16 and rotatable about its vertical axis by handle 66. Attached to the lower end of the shaft 62 is a dual arm bracket 68 having laterally extending lower and upper lever arms 70 and 72. The lower arm 70 is connected to a transmission control valve (not shown) disposed in the vehicle transmission 14 through an arm member 74. The arm member 74 is connected to the transmission control valve. This valve (not shown) must be moved to a Forward or Reverse position before the transmission can be actuated. It forms no part of this invention.

The shift control lever shaft 62 and the lever arm 72 attached thereto are so positioned that the lever arm 72 is in longitudinal alignment with the rod member 60 when the shift control lever is in a neutral position. A cam follower pin 76a and roller 76 are connected to and extend upwardly from the outer end of the lever arm 72.

Figure 2:
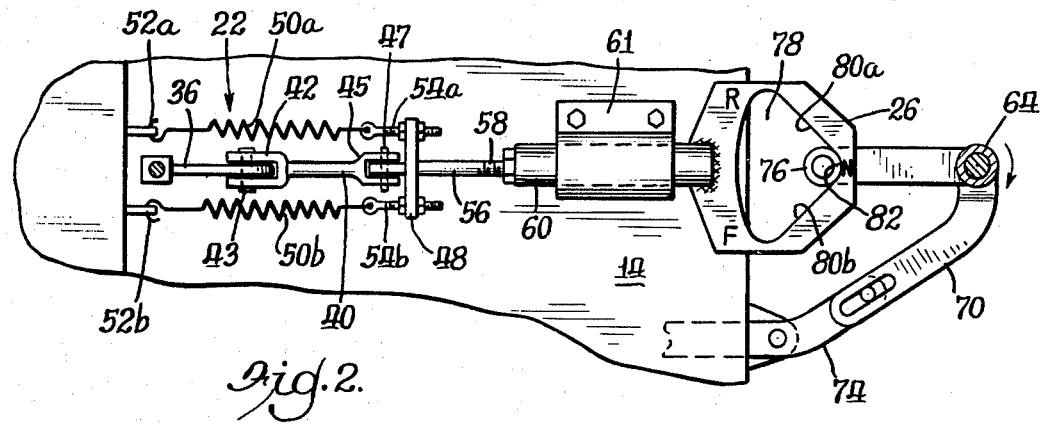
FIG. 2 is a plan view of a portion of the seat operated linkage of FIG. 1 taken along line 2—2 of FIG. 1 wherein the cam device of the linkage mechanism is in a position holding the manually operable transmission control element in a neutral position.

The control cam plate 26 is a flat plate having formed therein a substantially triangular opening 78 defined in part by the straight cam surfaces 80a and 80b. The control cam plate 26 in the environment in which it is disposed is the principal feature of the invention. The opening 78 is constructed to receive the cam follower roller 76 which is adapted to ride on the cam surfaces 80a and 80b. The cam surfaces 80a and 80b are adjacent to each other and intersect to form an included angle preferably of approximately 90° at the apex 82. The control cam plate 26 is used to urge the shift control lever 24 back to a neutral position as shown in FIG. 2 when the vehicle driver leaves the seat 18. In the neutral position the cam follower roller 76 rests at the apex 82 of the triangular opening.

Figure 3:
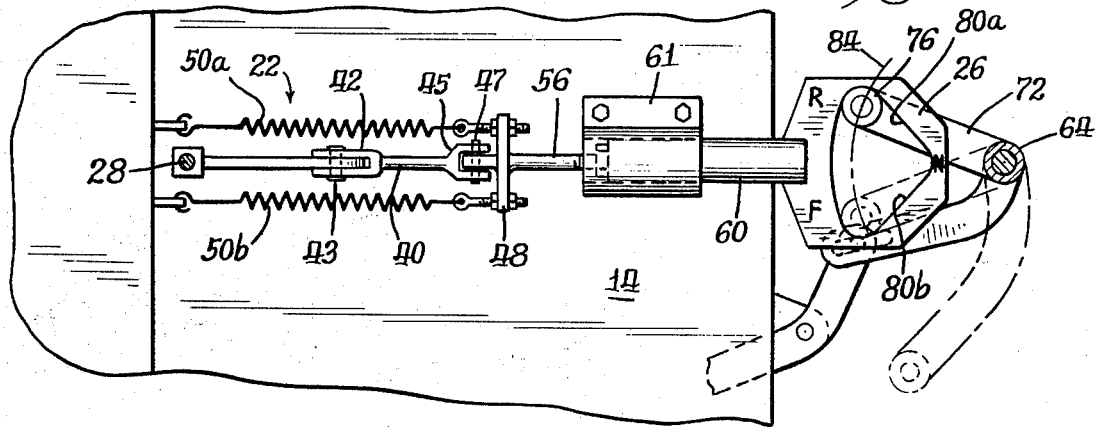
FIG. 3 is a plan view of a portion of the seat operated linkage of FIG. 1 wherein the cam device of the linkage mechanism is in a position allowing the manually operable transmission control element to be shifted to either a forward or reverse position.

The operation of the invention will now be explained. FIG. 1 shows the seat of the vehicle tilted forwardly i.e., in its normal unoccupied position. When the seat is occupied it presses down on the rod member 28 which rotates the bell crank 32 about its pivot 34 thus moving rod members 40, 56 and 60 and the control cam plate 26 to the right as viewed in FIG. 1 against the tension of return springs 50a and 50b. This moves the control cam plate to a position as shown in FIG. 3. In this position it will be apparent that the manually operable shift control element is freely rotatable either to a forward or reverse position since the cam follower roller 76 is free to be moved through an arc 84 inside the trangular opening 78 in the control cam plate 26. For example, with the arm 72 in the full line position as shown in FIG. 3, the shift control lever is in a Reverse position, i.e., the transmission control valve (not shown) but operable by arms 70 and 74, has been placed in a position to permit the vehicle to be propelled rearwardly. With the arm 72 in the phantom line position as shown in FIG. 3 the shift control lever would be in a Forward position, i.e., the transmission control valve (not shown) has been placed in a positon to permit the vehicle to be propelled forwardly.

If the seat 18 becomes unoccupied, either purposely or by accident, the tension return springs 50a and 50b of the linkage will be effective to automatically pull the control cam element 26 through intermediate arms 45, 56 and 60 back to a position as shown in FIG. 2. In moving to this position the control cam plate 26 through either of the cam surfaces 80a or 80b is effective to move the cam follower roller 76, and the arm 72 to which it is attached, to the neutral position shown in FIG. 2, and this is true whether the shift control element 24 was disposed in a Forward or Reverse position. It will be apparent from FIG. 2 that from this position the cam follower 76 is blocked from being swung through an arc such as 84, and the vertically extending shaft 62 and arms 70 and 74 can no longer be moved to manipulate the transmission control valve to which the arm 74 is attached. Thus the vehicle is prevented from accidentally being put in gear.

It will be apparent that I have provided a return-to-neutral device which is simple to manufacture, and yet provides a positive control for returning the transmission shift control element to neutral when the seat of the tractor or lift truck vehicle, for example, becomes unoccupied. Since safety is the prime consideration the positive control provided by the disclosed device is of substantial importance.

While a preferred embodiment of the invention has been disclosed, it will be appreciated that this is shown by way of example only, and the invention is not to be limited thereto as other variations will be apparent to those skilled in the art, and the invention is to be given its fullest possible interpretation within the terms of the following claims.

What is claimed is:

1. An automatic return-to-neutral mechanism for a vehicle transmission and wherein vehicle operator's seat assembly is adapted to move upwardly from an occupied position to an unoccupied position comprising:
   a seat-operated linkage mechanism including a portion of which is longitudinally movable;
   a transmission shift control lever mounted on the vehicle and shiftable in opposite directions from a neutral position to drive establishing positions;
   a first arm means connected to said shift control lever and including cam follower means mounted at the outer end of said arm means;
   a second arm means operatively connected to said shift control lever and adapted to be operatively connected to the vehicle transmission control valve;
   a cam control mechanism interconnecting said longitudinally movable portion of said linkage mechanism and said first arm means connected to said shift control lever;
   said cam control mechanism comprising a cam plate and means on said cam plate defining a pair of cam surfaces angularly disposed with respect to each other, and converging to an apex, said pair of cam surfaces being substantially symmetrically disposed about the longitudinal axis of said longitudinally movable portion of said linkage mechanism;
   said cam follower means being engageable with either of said pair of cam surfaces.

2. The device of claim 1 including
   tension return spring means connected to said longitudinally movable portion of said linkage mechanism to move the latter and said cam plate connected thereto to a neutral position when the operator's seat becomes unoccupied.

3. The device of claim 2 including
   tension spring adjusting means.

4. The device of claim 1 wherein
   said cam plate is rigidly attached to said longitudinally movable portion of said linkage mechanism.

5. The device of claim 1 wherein
   said linkage mechanism includes a support bracket adapted to be attached to the transmission housing and a rod member slidably disposed in said support bracket, said rod member being rigidly attached to said cam plate.

6. The device of claim 1 wherein
   said first and second arm means are integrally formed on a bracket member which is attached to said shift control lever.

7. The device of claim 1 wherein
   said cam plate is formed with triangular opening substantially in the shape of an isosceles triangle, the two equal legs of said triangle defining said pair of cam surfaces.

* * * * *